United States Patent [19]
Bates et al.

[11] Patent Number: 5,605,350
[45] Date of Patent: Feb. 25, 1997

[54] AIR BAG FOLD AND METHOD

[75] Inventors: Sonya A. Bates, Vandalia; John P. Sparkman, Dayton, both of Ohio

[73] Assignee: General Motors Corporation, Detroit, Mich.

[21] Appl. No.: 454,495

[22] Filed: May 30, 1995

[51] Int. Cl.$^6$ ............................................. B60R 21/20
[52] U.S. Cl. ............................ 280/743.1; 280/731
[58] Field of Search ............................. 280/743.1, 731, 280/728.1

[56] References Cited

U.S. PATENT DOCUMENTS

| | | | |
|---|---|---|---|
| 3,625,543 | 12/1971 | Wolff | 280/150 |
| 3,736,004 | 5/1973 | Haruna | 280/150 |
| 4,004,828 | 1/1977 | Sogabe et al. | 280/743 |
| 4,235,453 | 11/1980 | Lawson et al. | 280/743 |
| 4,332,398 | 6/1982 | Smith | 280/732 |
| 4,830,401 | 5/1989 | Honda | 280/736 |
| 5,002,306 | 3/1991 | Hiramitsu et al. | 280/731 |
| 5,022,675 | 6/1991 | Zelanak, Jr. et al. | 280/743 |
| 5,066,039 | 11/1991 | Shitanoki et al. | 280/741 |
| 5,140,799 | 8/1992 | Satoh | 53/429 |
| 5,162,035 | 11/1992 | Baker | 493/405 |
| 5,178,407 | 1/1993 | Kelley | 280/728.1 |
| 5,275,435 | 1/1994 | Fischer | 280/743 |
| 5,277,230 | 1/1994 | Sollars, Jr. | 139/389 |
| 5,290,061 | 3/1994 | Bollaert | 280/743 |
| 5,324,070 | 6/1994 | Kitagawa et al. | 280/743.1 |
| 5,342,087 | 8/1994 | Oda | 280/728.1 |
| 5,425,551 | 6/1995 | Hawthorn | 280/743.1 |
| 5,472,233 | 12/1995 | Horiuchi et al. | 280/743.1 |

FOREIGN PATENT DOCUMENTS

| | | | |
|---|---|---|---|
| 2154234 | 4/1973 | France | 280/743.1 |
| 4138645 | 6/1992 | Germany | 280/743.1 |
| 4-212651 | 8/1992 | Japan | 280/743.1 |

*Primary Examiner*—Eric D. Culbreth
*Attorney, Agent, or Firm*—Charles E. Leahy; Kathryn A. Marra

[57] ABSTRACT

A supplemental restraint system including an air bag for use in a vehicle to restrain an occupant during a sudden deceleration or collision. The air bag is folded in a fashion to facilitate reducing lateral deployment until the air bag deploys a predetermined distance when inflated by the inflator.

7 Claims, 9 Drawing Sheets

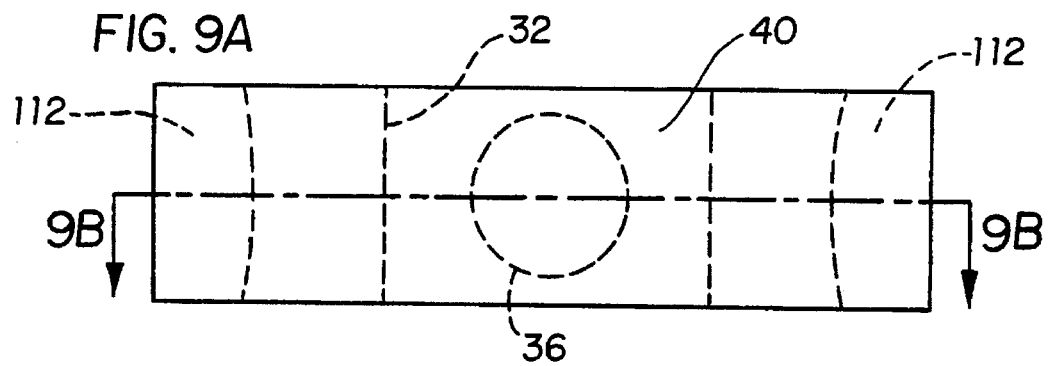
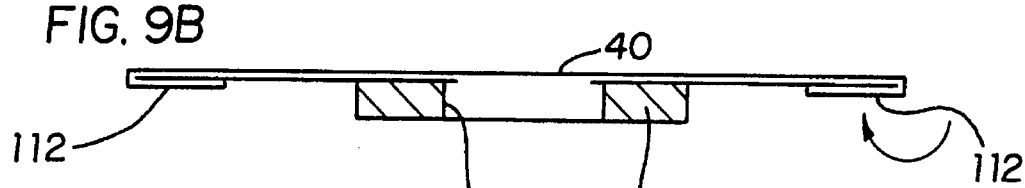
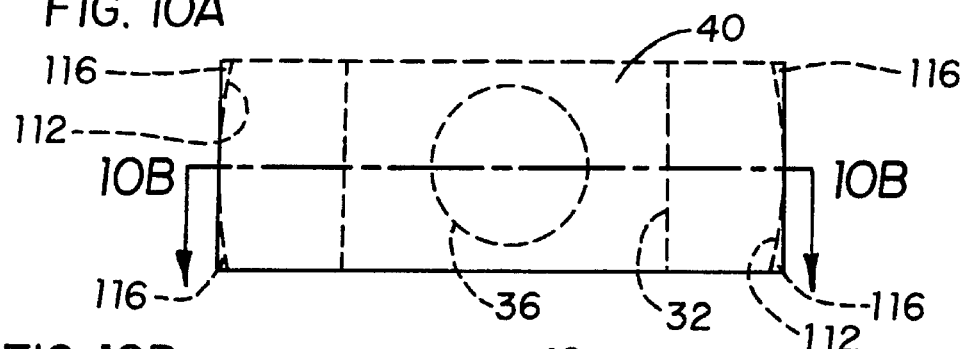
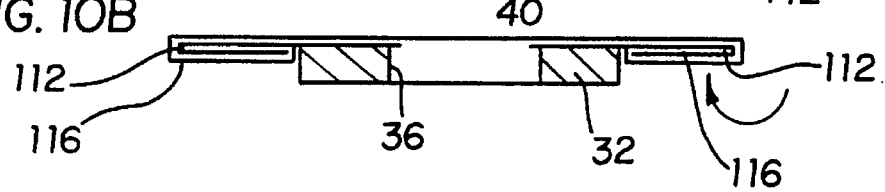
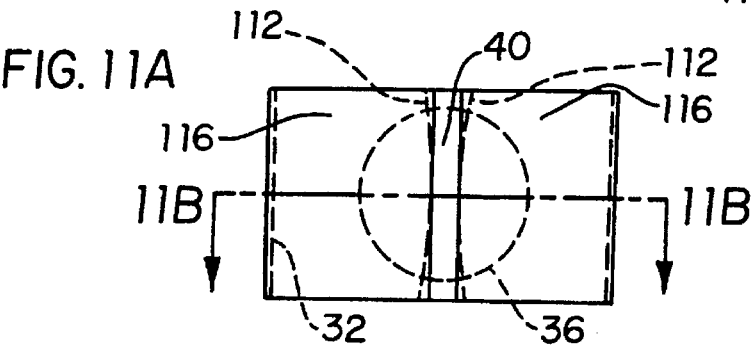
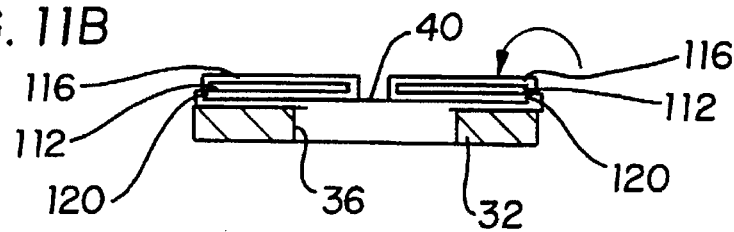

AIR BAG FOLD AND METHOD

BACKGROUND OF THE INVENTION

1. Field of the Invention

The present invention relates generally to vehicle supplemental inflatable restraint systems and, more particularly, to an air bag having an improved fold configuration.

2. Description of the Prior Art

Driver side or passenger side supplemental inflatable restraint ("SIR") systems are employed in vehicles to augment protection traditionally afforded vehicle occupants through the use of seat belts. SIR systems typically include an air bag which may be stored in a module assembly located within the interior of the vehicle in close proximity to either a driver or one or more passengers.

SIR systems typically actuate upon sudden deceleration, such as in a collision, so as to rapidly deploy an air bag to restrain the movement of the driver or passengers as the collision proceeds. During deployment, gas is emitted rapidly from an inflator into the air bag to expand it to a fully inflated state.

Recent SIR designs employ deep recessed module assemblies to maintain the air bags in a non-obtrusive, low profile condition during non-use to thereby improve the design flexibility and aesthetics of the SIR system. With such a deep recessed module assembly, the air bag has farther to travel in order to clear the steering wheel.

SUMMARY OF THE INVENTION

Thus, it is a primary object of this invention to provide an improved supplemental inflatable restraint system having an air bag fold configuration and method which facilitates having a deep deployment or recess area.

It is a further object of the present invention to provide an improved driver side supplemental inflatable restraint system having a folded air bag that has deployment characteristics which allow the air bag to deploy in an alternate route.

Another object is to provide an air bag fold which more effectively deploys in deep recesses, thereby facilitating increasing aesthetic and styling design flexibility.

Still another object is to provide an air bag fold and method which facilitates delaying lateral deployment of the air bag until it is above the rim.

In one aspect, this invention comprises a method of folding an air bag to facilitate enhancing deploying an air bag in a predetermined direction comprising the step of folding the air bag into a fold configuration which permits the air bag to deploy in the predetermined direction.

In one aspect of the present invention there is disclosed a supplemental inflatable restraint system, comprising: a base; an air bag mounted to the base; and an inflator in fluid communication with the air bag for inflating the air bag; the air bag having a fold configuration which facilitates reducing lateral deployment until the air bag moves a predetermined amount of time in a vertical direction away from the base.

In another aspect, this invention comprises a supplemental inflatable restraint system, comprising: a base; an air bag mounted to the base; and an inflator in fluid communication with the air bag for inflating the air bag; the air bag having a fold configuration which facilitates reducing lateral deployment until the air bag deploys a predetermined distance when inflated by the inflator.

These and other objects and advantages of the invention will be apparent from the following description, the accompanying drawings, and the appended claims.

BRIEF DESCRIPTION OF THE DRAWINGS

FIG. 9A is a top plan view of the sixth step in folding the air bag in accordance with the present invention, wherein the air bag has a pair of first stack folds extending inwardly from opposite lateral edges of the air bag and downwardly from the top surface of the air bag;

FIG. 9B is a cross-sectional view taken along line 9B—9B in FIG. 9A;

FIG. 10A is a top plan view of the seventh step in folding the air bag in accordance with the present invention, wherein the air bag has a pair of second stack folds extending inwardly from opposite lateral edges of the air bag and downwardly from the top surface of the air bag;

FIG. 10B is a cross-sectional view taken along line 10B—10B in FIG. 10A;

FIG. 11A is a top plan view of the eighth step in folding the air bag in accordance with the present invention, wherein the air bag has a pair of third stack folds extending inwardly from opposite lateral edges of the air bag and upwardly from the bottom surface of the air bag; and FIG. 11B is a cross-sectional view taken along line 11B—11B in FIG. 11A.

DETAILED DESCRIPTION OF THE PREFERRED EMBODIMENT

The supplemental inflatable restraint system of the present invention is particularly intended to be mounted within a vehicle steering wheel assembly for restraining a driver during sudden deceleration of the vehicle.

Figure 1A:
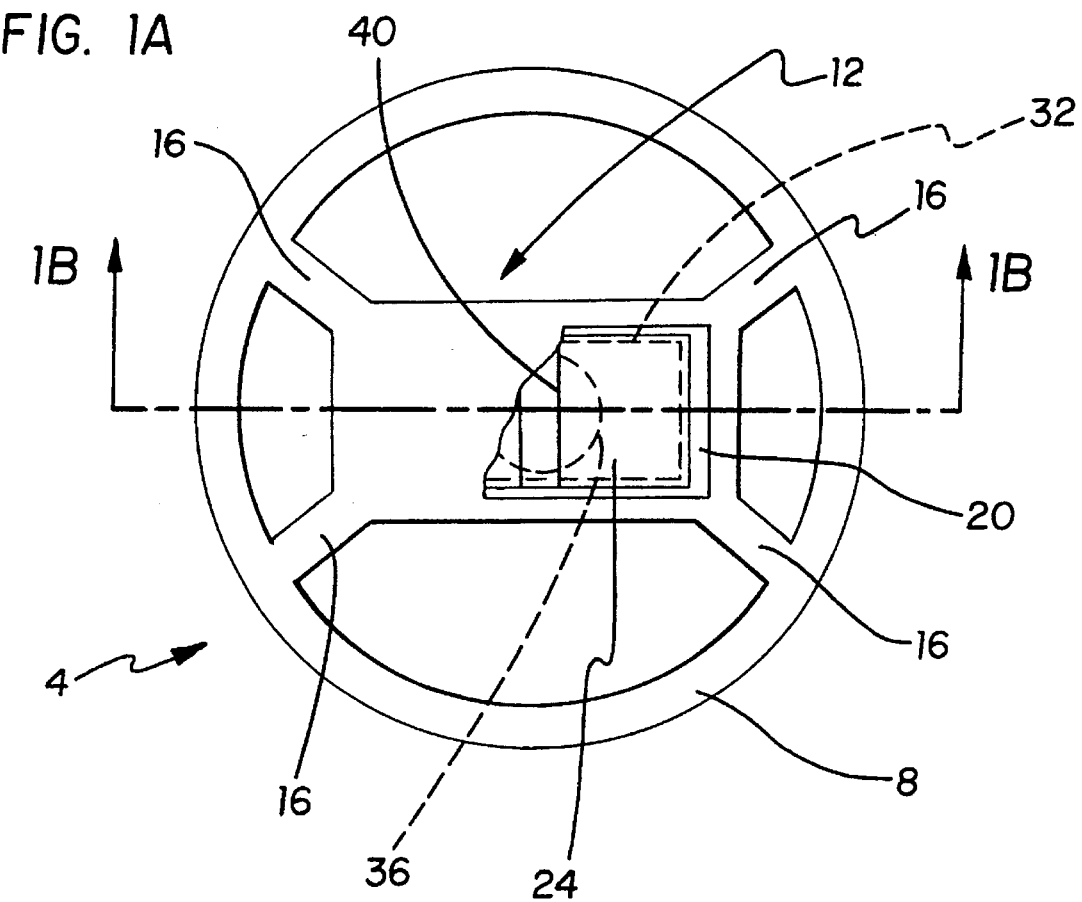
FIG. 1A is a partially cut away top plan view of a steering wheel assembly which employs a supplemental inflatable restraint system of the present invention.
Figure 1B:
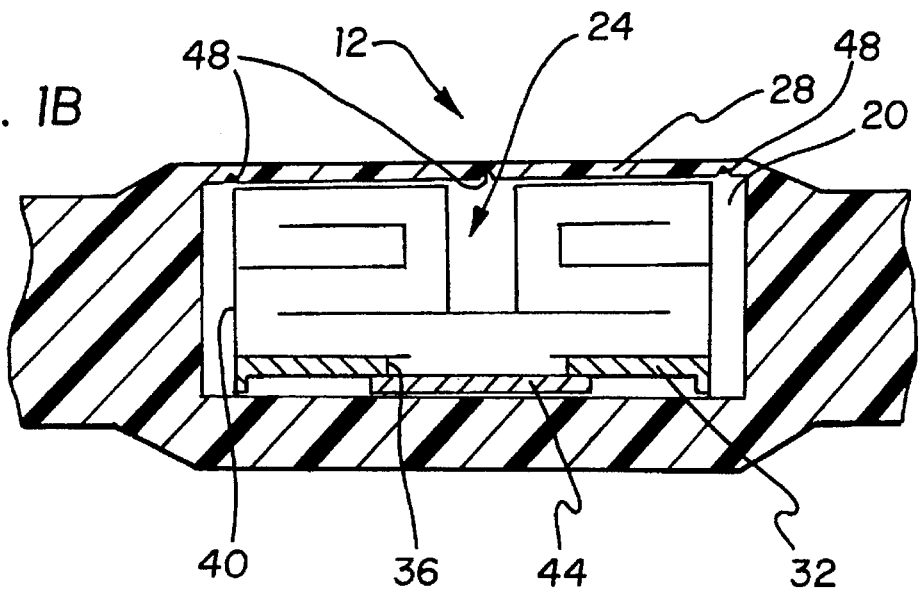
FIG. 1B is an enlarged cross-sectional view taken along line 1B—1B in FIG. 1A after a folded air bag has been mounted to the steering wheel assembly.

Referring initially to FIGS. 1A and 1B, there is shown a steering wheel assembly 4 having a circular rim portion 8 connected to a centrally located hub portion 12 via four connecting spokes 16. Hub portion 12 has a supplemental inflatable restraint system receiving area (SIR receiving area) 20 which serves as a receptacle for a supplemental inflatable restraint system (SIR system) 24. SIR system 24 is enclosed within SIR receiving area 20 by a cover member 28 that is contiguously formed as part of hub portion 12.

SIR system 24 includes a generally planar base unit 32 having a centrally located inflator aperture 36. Base unit 32 is generally rectangular in shape in the embodiment being described, but it should be appreciated that other shapes may be used. Referring to FIG. 1A, base unit 32 generally complements the shape of SIR receiving area 20. In this embodiment, the steering wheel assembly 4 may define a recess or deployment area 65 having a depth, generally indicated by double arrow 5 in FIG. 2A, of about at least 12 mm. Also shown in FIG. 1A, air bag 40, when folded in accordance with the present invention, generally complements the rectangular shape of SIR receiving area 20. Folding air bag 40 as such efficiently utilizes the space within SIR receiving area 20 to thereby provide improved aesthetics and greater design flexibility.

SIR receiving area 20 has a depth sufficient to facilitate deep recessing SIR system 24 up to 35 mm within SIR receiving area 20. The deep recessing of SIR system 24 increases the distance between the driver and SIR system 24. Such deep recessing of SIR system 24 provides improved aesthetics and styling freedom.

An air bag 40 is attached to base unit 32 and an inflator 44 is associated with inflator aperture 36 in a conventional manner. The exact fold configuration of air bag 40 as it resides within SIR receiving area 20 will be described later with reference to FIGS. 3a–11b. The generally planar inflator 44 generally comprises the same shape as inflator aperture 36 and is situated adjacent base unit 32 opposite air bag 40 such that inflator 44 is in fluid communication with the interior of air bag 40. Inflator 44 is mounted to base unit 32 in a conventional manner and situated to direct an inflating fluid, such as nitrogen gas, into air bag 40 to thereby inflate air bag 40.

Referring specifically to FIG. 1B, lines of weakness 48 are formed on the underside of cover member 28 to provide areas of weakness that will yield to open cover member 28 when inflator 44 is activated. As such, air bag 40 will penetrate through cover member 28 during deployment to inflate and absorb the force exerted by a forward traveling vehicle occupant.

Figure 2A:
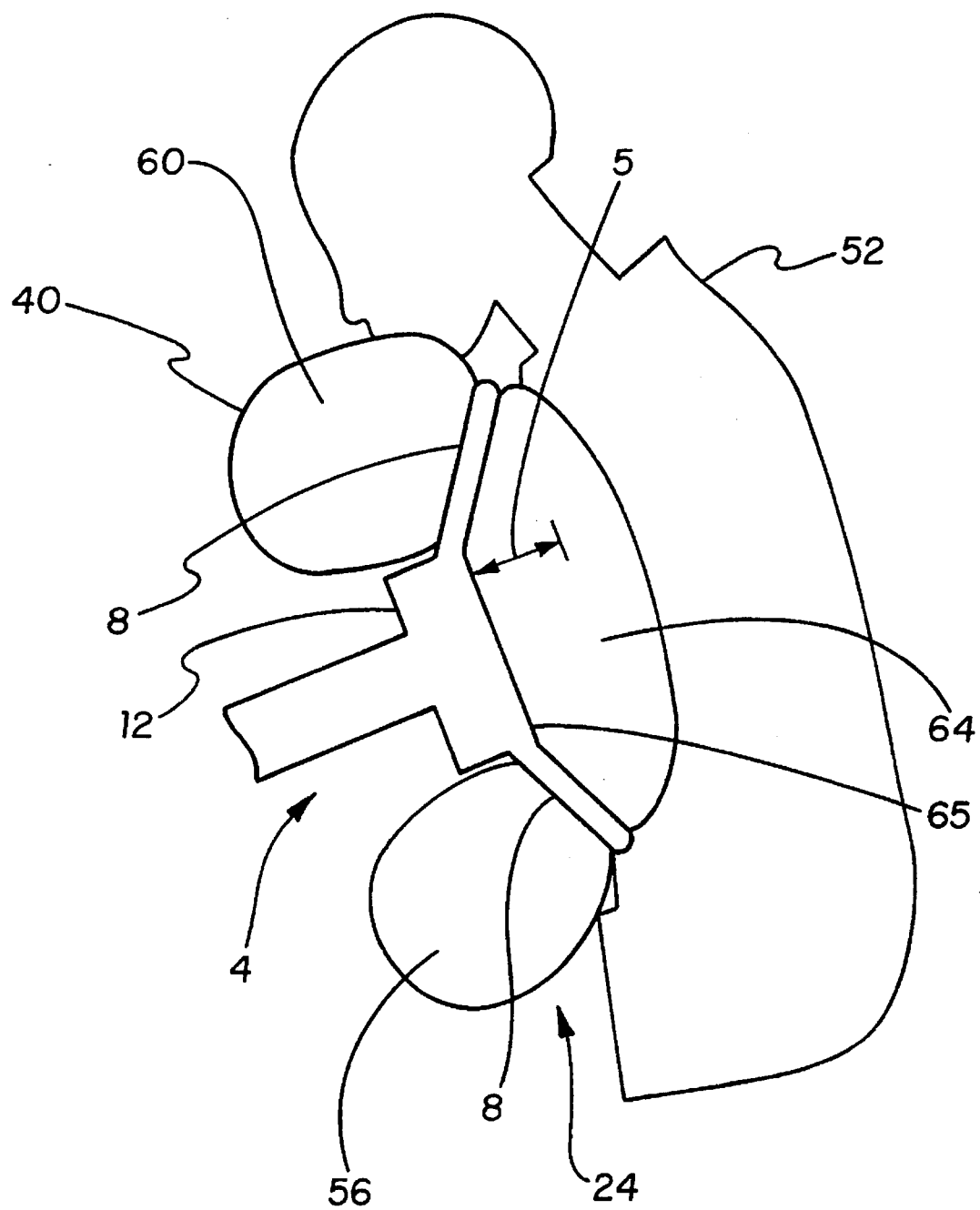
FIG. 2A is a side view of the present invention illustrating the air bag deployment characteristics.

Referring now to FIG. 2A, shown is SIR system 24 of the present invention wherein air bag 40 is in a fully deployed state during a collision situation. In such a situation, air bag 40 will deploy such that a lower subtroverting portion 56 and an upper subtroverting portion 60 form under rim portion 8 opposite occupant 52. Lower subtroverting portion 56 and upper subtroverting portion 60, which are contiguously formed as part of air bag 40, act upon rim portion 8 during deployment so as to bend rim portion 8 toward occupant 52. Through this deployment scheme, lower subtroverting portion 56 and upper subtroverting portion 60 provide an alternate deployment route for air bag 40 to decrease the force exerted upon occupant 52 by the primary central portion 64 of air bag 40.

Figure 2B:
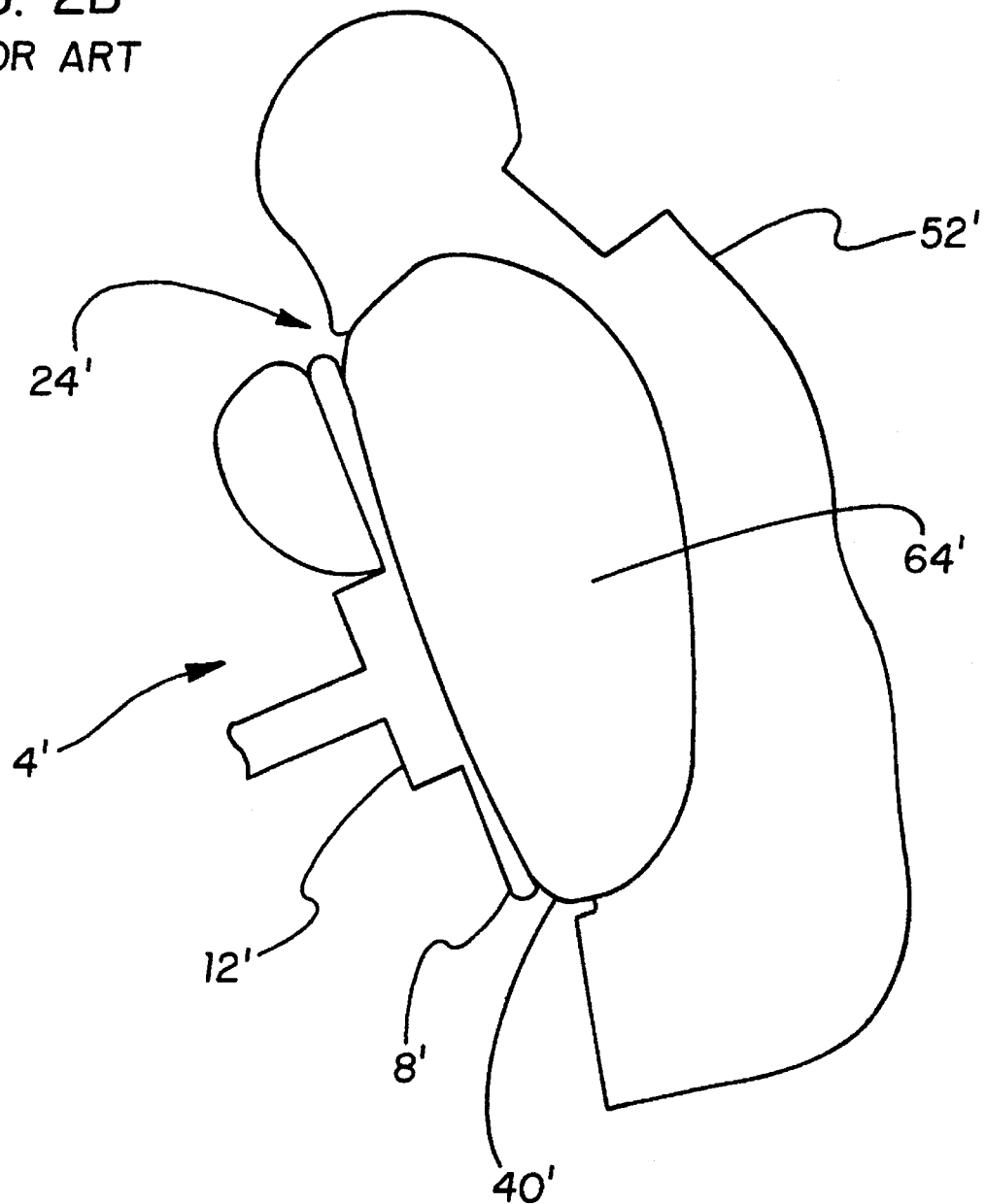
FIG. 2B is a side view of a prior art air bag deployment characteristic.

Referring to FIG. 2B, shown is a prior art SIR system 24' during a collision situation. Under this prior art deployment scheme, the inflation of air bag 40' produces a relatively large primary central portion 64' of air bag 40' in relation to occupant 52'.

Referring to FIG. 2A, the deployment scheme of the present invention produces a relatively small primary central portion 64 in relation to occupant 52. The folding process will now be described in detail.

Figure 3A:
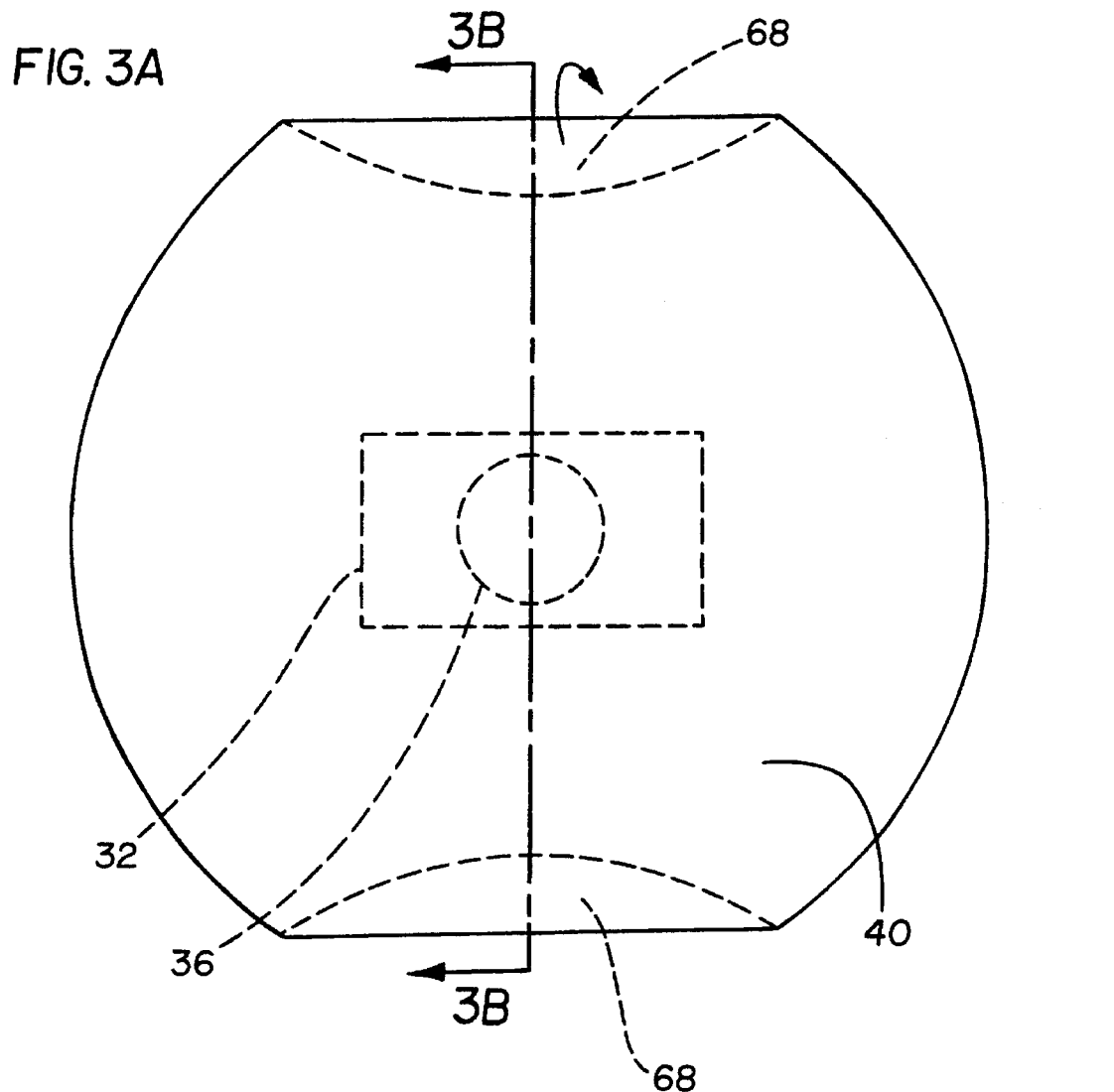
FIG. 3A is a top plan view of the first step in folding the air bag in accordance with the present invention, wherein a pair of first folds extend inwardly from opposite longitudinal edges of the air bag and downwardly from the top surface of the air bag.
Figure 3B:
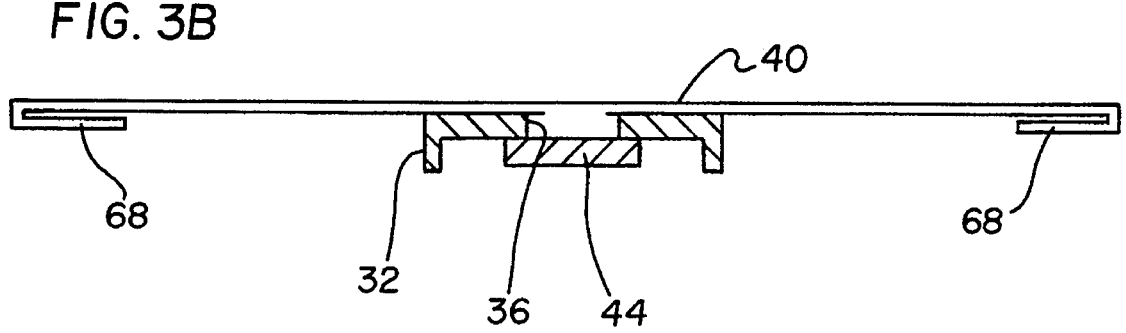
FIG. 3B is an expanded cross-sectional view taken along line 3B—3B in FIG. 3A.

Referring now to FIGS. 3A and 3B, shown is the first step in folding air bag 40 in accordance with the present invention. A pair of first folds 68 being roll folds are folded under air bag 40 from opposing longitudinal edges thereof toward base unit 32. The longitudinal edge of each first fold 68 is perpendicular to the lengthwise axis of base unit 32, which is depicted by line 3B—3B. Each first fold 68, and the subsequent folds of the present invention hereafter disclosed with reference to FIGS. 4A—7B, have a width of approximately 1/14 the diameter of air bag 40. In the embodiment being described, the width of each first fold is approximately 2 inches.

Figure 4A:
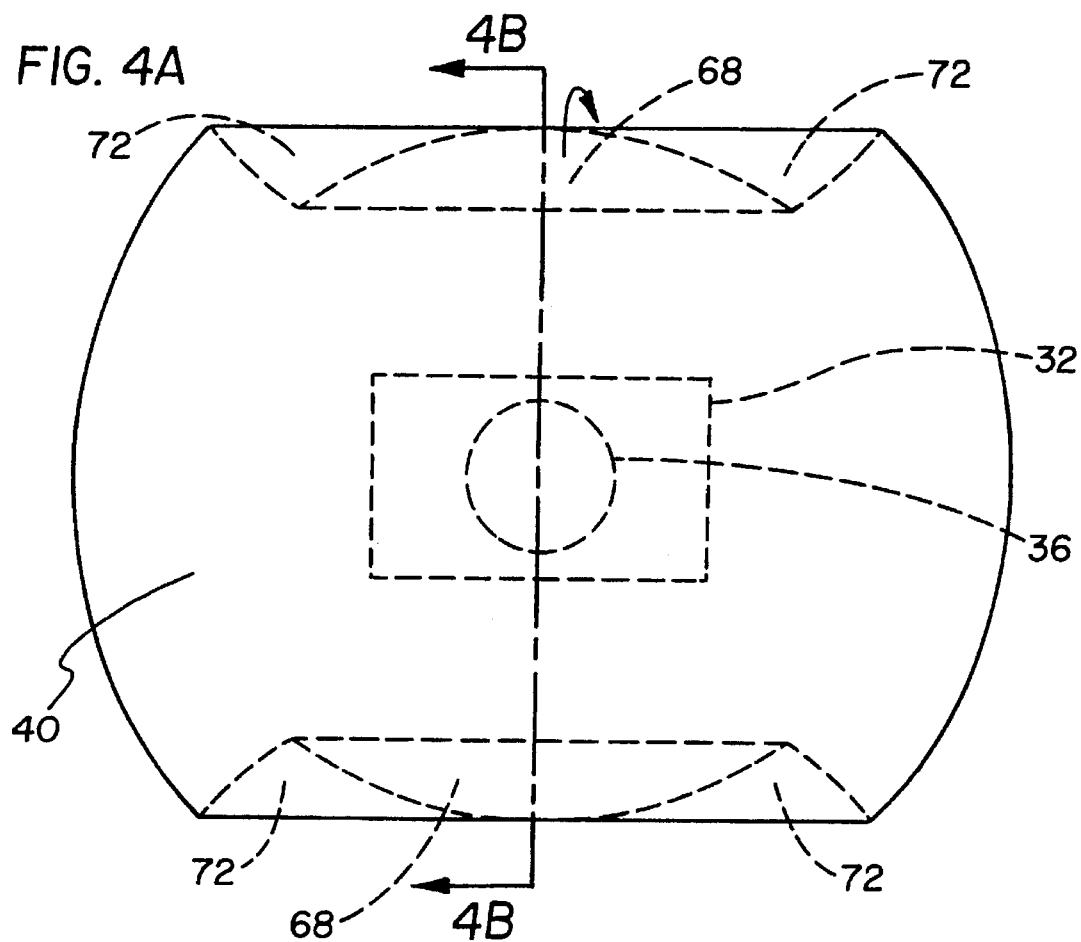
FIG. 4A is a top plan view of the second step in folding the air bag in accordance with the present invention, wherein the air bag is folded to have a pair of second folds extending inwardly from opposite longitudianl edges of the air bag and downwardly from the top surface of the air bag.
Figure 4B:
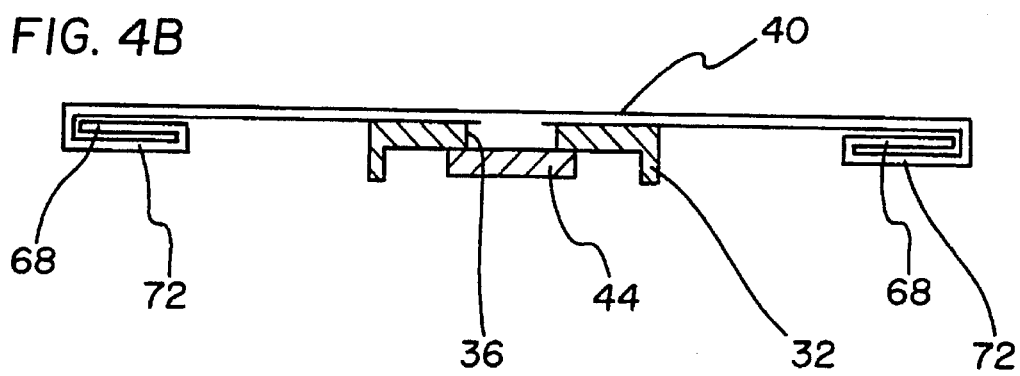
FIG. 4B is an expanded cross-sectional view taken along line 4B—4B in FIG. 4A.

Referring now to FIGS. 4A and 4B, shown is the second step in folding air bag 40 in accordance with the present invention. A pair of second folds 72 being roll folds are formed by folding the parallel longitudinal edges of first folds 68 under air bag 40 and inward toward base unit 32. As such, second folds 72 are folded under air bag 40 in the same direction as first folds 68 in relation to the surface of air bag 40. As shown in FIG. 4B, second folds 72 have approximately the same width as first folds 68. The longitudinal edge of each second fold 72 is perpendicular to the lengthwise axis of base unit 32, which is depicted by line 4B—4B.

Figure 5A:
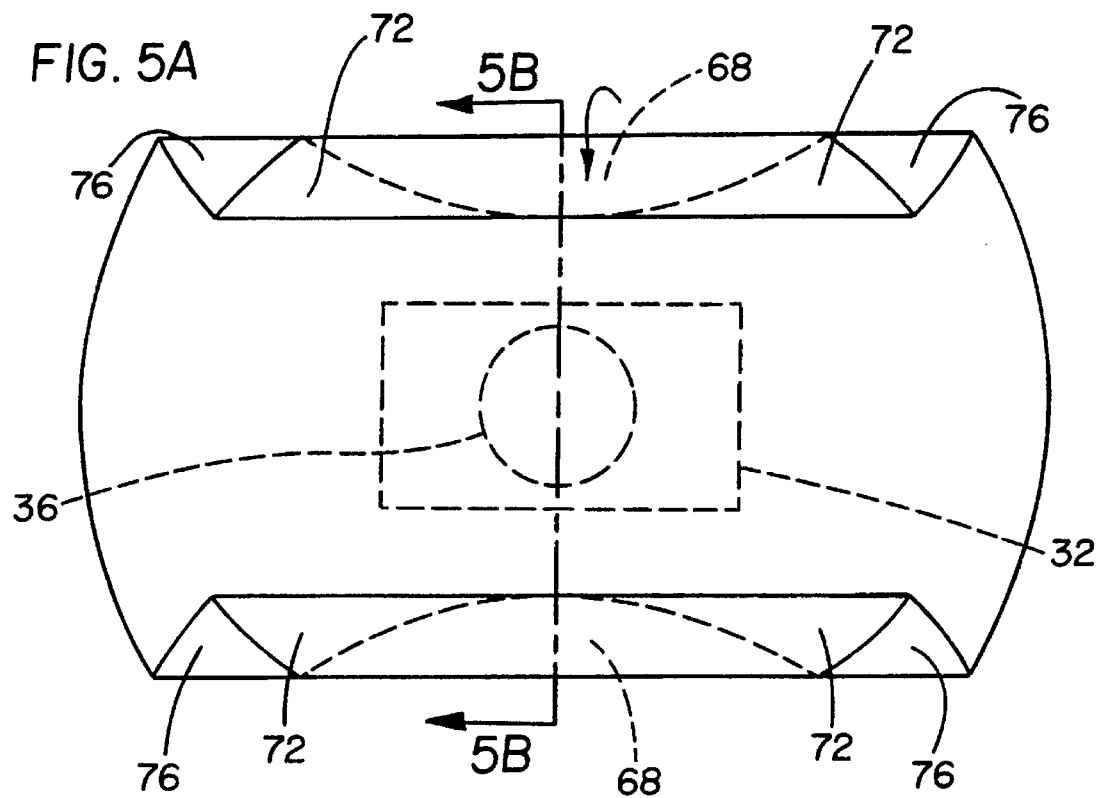
FIG. 5A is a top plan view of the third step in folding the air bag in accordance with the present invention, wherein the air bag has a pair of third folds extending inwardly from opposite longitudinal edges of the air bag and upwardly from the bottom surface of the air bag.
Figure 5B:
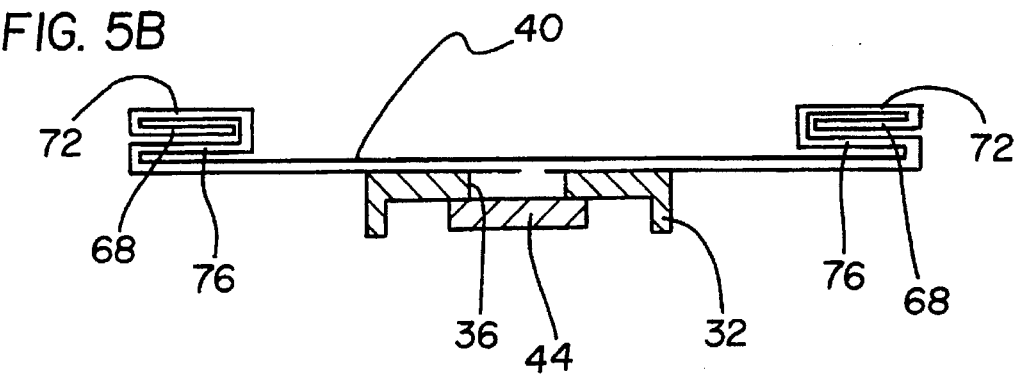
FIG. 5B is an expanded cross-sectional view taken along line 5B—5B in FIG. 5A.

Referring now to FIGS. 5A and 5B, shown is the third step in folding air bag 40 in accordance with the present invention. A pair of third folds 76 being fan folds are formed by folding the longitudinal edge of each second fold 72 upward from the underside of air bag 40 and inward toward base unit 32. Third folds 76, therefore, are folded in the opposite direction as were first and second folds 68, 72 relative to the surface of air bag 40.

The width of third folds 76 is approximately 2 inches, or generally the same width as the stacked combination of first folds 68 and second folds 72. The longitudinal edge of each third fold 76 is perpendicular to the lengthwise axis of base unit 32, which is depicted by line 5B—5B.

Figure 6A:
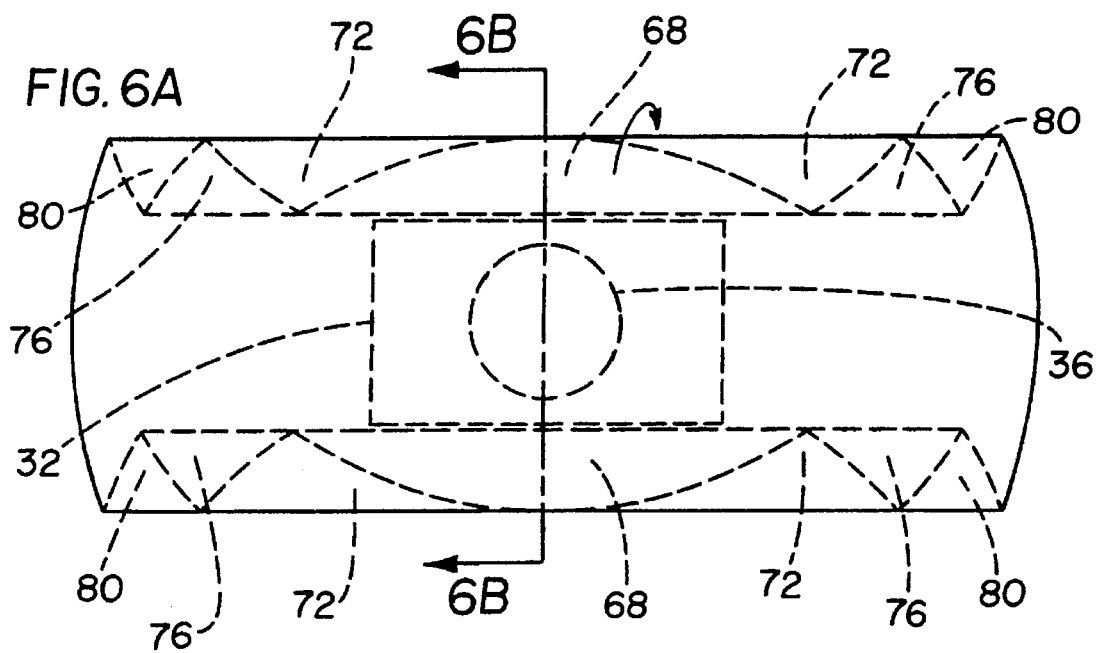
FIG. 6A is a top plan view of the fourth step in folding the air bag in accordance with the present invention, wherein the air bag has a pair of fourth folds extending inwardly from opposite longitudinal edges of the air bag and downwardly from the top surface of the air bag.
Figure 6B:
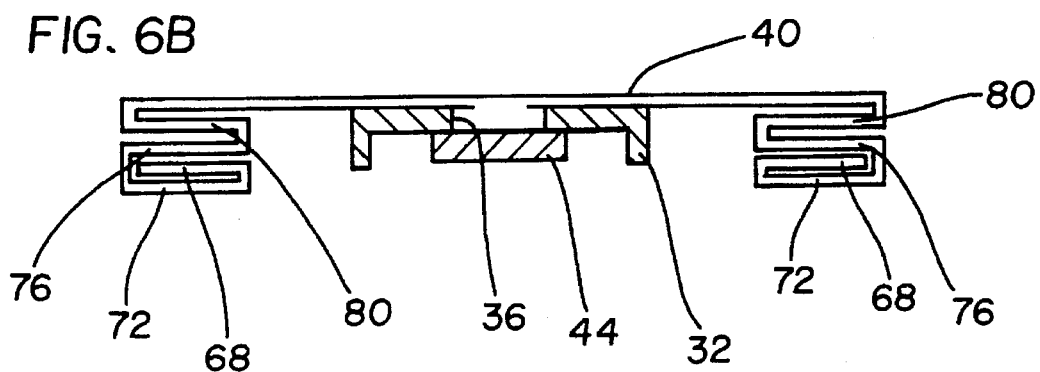
FIG. 6B is a cross-sectional view taken along line 6B—6B in FIG. 6A.

Referring now to FIGS. 6A and 6B, the fourth step in folding air bag 40 in accordance with the present invention is shown. A pair of fourth folds 80 being fan folds are formed by folding the parallel longitudinal edges of third folds 76 under air bag 40 and inward toward base unit 32. As such, fourth folds 80 are folded under air bag 40 in the same direction as first and second folds 68, 72 in relation to the surface of air bag 40. As shown in FIG. 6B, fourth folds 80 have approximately the same width as the stacked combination of first, second and third folds 68, 72, 76. The longitudinal edge of each fourth fold 80 is perpendicular to the lengthwise axis of base unit 32, which is depicted by line 6B—6B.

Figure 7A:
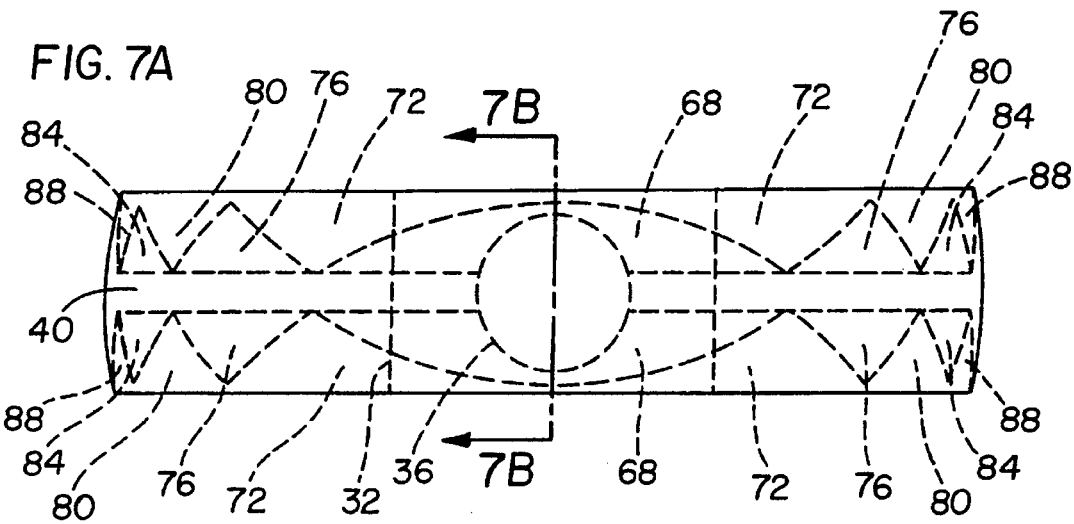
FIG. 7A is a top plan view of the fifth step in folding the air bag in accordance with the present invention, wherein the air bag has a pair of fifth and sixth folds extending inwardly from opposite longitudinal edges of the air bag to envelop the first, second, third and fourth folds therebetween.
Figure 7B:
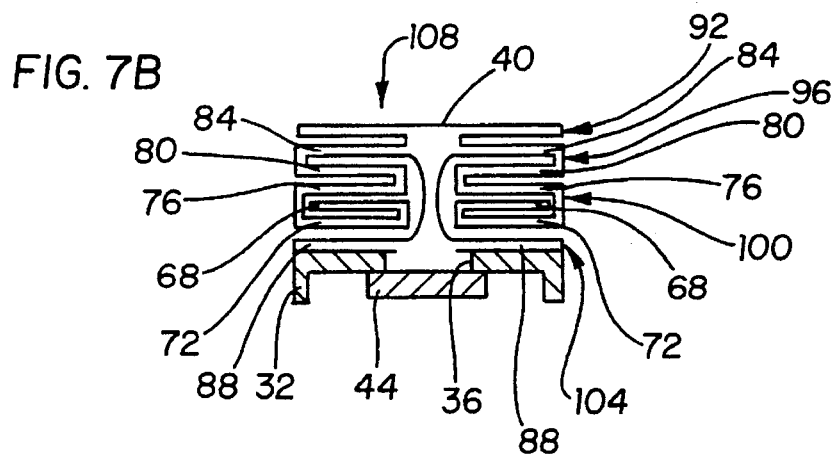
FIG. 7B is a cross-sectional view taken along line 7B—7B in FIG. 7A.

Referring now to FIGS. 7A and 7B, the stacked combination of first, second, third and fourth folds 68, 72, 76, 80 are tucked or drawn longitudianal inward toward inflator aperture 36 such that a pair of fifth folds 84 and a pair of sixth folds 88 each being tuck folds are formed above and below the aforementioned stacked combination, respectively. As shown in FIG. 7B, fifth and sixth folds 84, 88 have generally the same width as the stacked combination of first, second, third and fourth folds 68, 72, 76, 80. The stacked combination of first, second, third, fourth, fifth, and sixth folds 68, 72, 76, 80, 84, 88, heretofore referred to as stack 108, has a combined width generally equal to the length of base unit 32, which is depicted by line 7B—7B.

Figure 8:
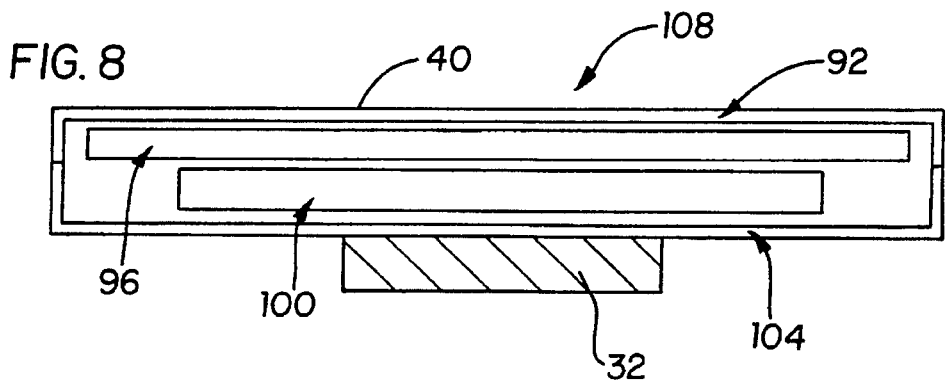
FIG. 8 is a side view of the present invention taken after the completion of the fifth step as shown in FIG. 7A.

Referring to FIG. 8, shown is an expanded side view of the present invention after completion of the fifth folding step as depicted in FIGS. 7A and 7B. Referring specifically to FIGS. 7B and 8, air bag 40 is folded to form a first lateral border 92 between the upper surface of air bag 40 and fifth fold 84, a second lateral border 96 between fifth fold 84 and fourth fold 80, a third lateral border 100 between third fold 76 and second fold 72, and a fourth lateral border 104 between second fold 72 and base unit 32. While shown in an expanded form in FIG. 8, the stacked combination of folds which comprise stack 108 actually reside in close vertical proximity to one another such that stack 108 is approximately 0.5 inches in height.

Referring now to FIGS. 9 through 11, shown is another fold progression of stack 108 in accordance with the present invention. For simplicity, stack 108 is shown in FIGS. 9–11 without setting out the detailed stack combination of first, second, third, fourth, fifth, and sixth folds 68, 72, 76, 80, 84, 88 as illustrated in FIGS. 7B and 8.

Referring specifically to FIGS. 9A and 9B, shown is the sixth step in folding air bag 40 in accordance with the present invention. A pair of first stack folds 112 being roll folds are formed by folding the opposing lateral edges along the widthwise axis, depicted as line 9B—9B, under air bag 40 and inward toward base unit 32. In the present embodiment, the width of each first stack fold 112 is approximately ⅛ the width of stack 108 while unfolded, as shown in FIGS. 7A and 8.

Referring now to FIGS. 10A and 10B, shown is the seventh step in folding air bag 40 in accordance with the present invention. A pair of second stack folds 116 being roll folds are formed by folding the parallel lateral edges of first stack folds 112 under air bag 40 and inward toward base unit 32. As such, second stack folds 116 are folded under air bag 40 in the same direction as first stack folds 112 in relation to the surface of air bag 40. As shown in FIG. 10B, second stack folds 116 have approximately the same width as first stack folds 112.

Referring now to FIGS. 11A and 11B, shown is the eighth step in folding air bag 40 in accordance with the present invention. A pair of third stack folds 120 being fan folds are formed by folding the lateral edge of each second stack fold 116 upward from the underside of air bag 40 and inward toward base unit 32. Third stack folds 120, therefore, are folded in the opposite direction as were first and second stack folds 112, 116 relative to the surface of air bag 40.

The width of third stack folds 120 is approximately the same width as the stacked combination of first and second stack folds 112, 116. The lateral edge of each third stack fold 120 is parallel to, and generally flush with, the edge of base unit 32 such that the stacked combination of first, second and third stack folds 112, 116, 120 generally compliments the shape of base unit 32.

Through the aforementioned multi-step folding procedure, air bag 40 is folded onto base unit 32 such that SIR system 24 can be stored compactly within SIR receiving area 20, as shown in FIGS. 1A and 1B. Such a deep recessed SIR receiving area 20 provides improved aesthetics and greater styling flexibility, with air bag 40 maintaining a low profile with respect to steering wheel assembly 4.

The improved fold of the present invention facilitates delaying lateral expansion or unfolding of the air bag for a predetermined time of about 4 ms until the bag is out of its recess and, preferably, above the rim, depending on the output of inflator 44. Stated another way, this air bag and method causes the bag to deploy vertically away from the base 32 for a predetermined time or distance, such as 4 ms or 35 mm, respectively, before the bag deploys laterally.

While the forms of the device herein described constitute the preferred embodiments of the invention, it is to be understood that the invention is not limited to these precise forms of the device. Thus, changes may be made without departing from the scope of the invention which is defined in the appended claims.

What is claimed is:

1. A supplemental inflatable restraint system in a vehicle for restraining an occupant, comprising:

a steering wheel having a hub portion, a rim portion, and spoke portions connecting the hub portion to the rim portion;

an inflator for generating gas; and an air bag inflatable upon generation of gas by the inflator, the air bag having an upper portion, a lower portion and a central portion, the air bag having a fold configuration including a fold stack having a roll fold and a fan fold and two tuck folds and wherein the roll fold and the fan fold are positioned between the two tuck folds in the fold stack such that when the air bag interacts with the occupant, inflation of the deploying air bag is blocked and the upper portion and the lower portion of the air bag are each directed away from the occupant and under the rim portion and between the spoke portions such that the upper and lower portions of the air bag engage the rim portion and are restrained from deployment in a rearwardly direction towards the occupant.

2. The supplemental inflatable restraint system of claim 1 wherein the fan fold is positioned rearward the roll fold in the fold stack.

3. The supplemental inflatable restraint system of claim 1 wherein the the fold stack includes at least two adjacent roll folds, and two adjacent fan folds.

4. The supplemental inflatable restraint system of claim 3 wherein the fan folds are positioned rearward the tuck folds in the fold stack.

5. A method of folding an air bag having a rearward surface for facing an occupant, comprising the steps of:

providing an air bag having an upper portion, a lower portion, and a central portion; and folding the air bag into a fold configuration which directs deployment of the upper and lower portions of the air bag beneath a rim portion of a steering wheel for engagement with the rim portion when air bag deployment is blocked by engagement of the rearward surface with the occupant and which directs deployment of the air bag in a rearward direction towards the occupant and free of engagement beneath the rim portion of the steering wheel prior to lateral deployment of the air bag when the air bag is unrestrained by interaction with the occupant, the step of folding the air bag further including the steps of providing an air bag having upper and lower opposing longitudinal edges;

providing first and second roll folds on each of the longitudinal edges;

providing first and second fan folds on each of the longitudinal edges;

and providing each of the longitudinal edges with an upper tuck fold and a lower tuck fold and tucking the stacked combination of first and second roll folds and first and second fan folds inward between the tuck folds to provide a laterally extending fold stack including first and second roll folds, first and second fan folds and forward and rearward tuck folds.

6. A method of folding an air bag having upper and lower portions and a rearward surface for facing an occupant such that the upper and lower portions of the air bag are directed beneath a rim portion of a steering wheel and restrained from rearward movement towards the occupant by engagement with the rim portion when deployment of the air bag is blocked by interaction of the air bag with the occupant, the method comprising the steps of:

providing an air bag having opposing longitudinal edges;

providing first and second roll folds on each of the longitudinal edges in a direction away from the surface;

providing a first fan fold on each of the longitudinal edges in a direction towards the surface;

providing a second fan fold on each of the longitudinal edges in a direction away from the surface; and providing each of the longitudinal edges with an upper tuck fold and a lower tuck fold and tucking the stacked combinations of first and second roll folds and first and second fan folds inward between the tuck folds to provide a laterally extending fold stack including pairs of first and second roll folds, first and second fan folds and upper and lower tuck folds.

7. The method of claim 6 further comprising the steps of: providing first and second stack folds in opposing ends of the fold stack by roll folding lateral edges of the fold stack in a direction away from the surface and in a direction perpendicular to the first and second roll folds; and providing a third stack fold in opposing ends of the fold stack by fan folding the lateral edges in a direction towards the surface and in a direction perpendicular to the first and second fan folds.

* * * * *